2,916,419
Patented Dec. 8, 1959

2,916,419

METHODS FOR ENRICHMENT OF ALKOXY-GLYCEROLESTERS FROM LIPID MIXTURES

John Karl Oskar Hubert Holmberg, Akersberga, Stockholm, and Clara Agnes Gunvor Sellmann, Stockholm, Sweden, assignors to A/B Kabi, Stockholm, Sweden, a corporation of Sweden No Drawing. Application December 18, 1956
Serial No. 628,966

Claims priority, application Sweden December 23, 1955

11 Claims. (Cl. 195—3)

The present invention relates to methods for isolation of alkoxyglycerolesters from lipid mixtures. Alkoxyglycerolesters occur in nature in the lipids from bone marrow, liver, spleen and the red cells. Further, alkoxyglycerolesters are found in milk fat and in egg oil. The percentages vary from about a tenth of a percent in some natural products up to 10 or 15 in others. In natural raw materials, the alkoxyglycerolesters in common are present in the form of fatty acid diesters.

The method according to the present invention relates to a method for isolating the alkoxyglycerolesters of natural raw materials and in such percentages that the resulting concentrates are substantially free from other constituents present in the original or starting raw materials. The method involves the discovery that fats, mixtures of fats or oils containing alkoxyglycerolesters can be treated with lipolytic enzymes of such specificity that by them only triglycerides are hydrolyzed whereas the alkoxyglycerolesters remain substantially without being hydrolyzed or split. Thereafter the isolation (i.e. enrichment in concentration) is conducted in a commonly available way, such as by separating the resulting free fatty acids and glycerol from the remaining non-split esters which consist of the desired alkoxyglycerolesters (i.e. as fatty acid diesters).

The applicable lipolytic enzymes that hydrolyze or split only triglycerides and not alkoxyglycerolesters are referred to broadly as a "triglyceride-splitting lipolytic enzyme inert to alkoxyglycerolesters." Such a specific enzyme can be obtained, for example, from the seeds of the plant Ricinus communis, as Ricinus lipase. Other potential sources for such enzymes are plants belonging to the families Ranunculaceae and Papaveraceae.

The isolation and concentration (enrichment) of the alkoxyglycerolesters from the split products of the original lipid mixture can be carried out by methods available in the art, such as alkali refining, distillation, or selective extraction, or by other methods employed in the fat industry for the separation of esters and free fatty acids.

The following examples serve to illustrate, but are not restrictive of, the invention:

*Example 1.*—Castor beans are decorticated and crushed. The crushed seeds are extracted with ethyl ether for 2 days using an ordinary Soxhlet apparatus. After this extraction, the residue is ground and the portion passing a 40 mesh sieve is finally extracted with ethyl ether for at least another 2 days. All fatty material in the original seeds is now removed. The residue from these extractions is air-dried and used as a lipase concentrate. This special concentrate is in the following referred to as "pulverized and ether-extracted seeds of Ricinus communis."

The liver oil from the fish Somniosus microcephalus (Greenland shark) contains about 40 percent of alkoxyglycerolesters, mainly esters of batyl and selachyl alcohols. To 1 kilogram of this oil are added 50 grams of pulverized and ether-extracted seeds from the plant Ricinus communis, and 2 liters of a sodium acetate buffer solution of pH 4.5, and finally 2.5 liters of petroleum ether (boiling range 40 to 60° C.). It is important that lipase concentrate in the form of ether-extracted seeds is added to the "fat" before any water (buffer solution) is added. The mixture is shaken to form an emulsion and left under slow mechanical stirring for 24 hours at 20° C. Ten liters of ethyl ether are added, and the free fatty acids are removed by saponification with 125 grams of sodium hydroxide in a 10 percent water solution. The resulting ethereal solution contains the alkoxyglycerolesters and slight amounts of unchanged glycerides. By evaporating off the ether, the alkoxyglycerolesters are isolated in a 96% purity.

*Example 2.*—1 kilogram of residual oil from the molecular distillation of the liver oil, from the fish Somniosus microcephalus, containing approximately 40 percent of alkoxyglycerolesters, is treated during 24 hours at 20° C. with 50 grams of pulverized and ether-extracted seeds from the plant Ricinus communis in the presence of 2 liters of sodium acetate buffer of pH 4.5. After separation of the esters from the free fatty acids in the same manner as in Example 1, the recovered alkoxyglycerolesters were in 100 percent concentration.

*Example 3.*—50 grams of the liver oil from the fish Squalus acanthias, containing 17 percent of alkoxyglycerolesters, are treated over 24 hours at 20° C. with Ricinus lipase in the form of 2.5 grams of pulverized and ether-extracted seeds from the plant Ricinus communis in 100 milliliters of sodium acetate buffer solution and 125 milliliters of petroleum ether. After working up the hydrolysate as in Example 1, the alkoxyglycerolesters were isolated in a concentration of 88 percent.

*Example 4.*—50 grams of bone grease, that contained 0.5 percent of alkoxyglycerolesters, were dissolved in 125 milliliters of petroleum ether and treated over 24 hours at 20° C. with Ricinus lipase in the form of 2.5 grams of pulverized and ether-extracted seeds from the plant Ricinus communis in 100 milliliters of sodium acetate buffer solution. After working up the reaction mixture as in Example 1, a 32 percent concentration of alkoxyglycerolesters was obtained. By repeated treatment of the earlier isolated concentrate the percentage could be increased further.

*Example 5.*—50 grams of egg oil containing less than 0.2% of alkoxyglycerolesters are treated with Ricinus lipase in the form of 2.5 grams of pulverized and ether-extracted seeds from the plant Ricinus communis in 100 milliliters of sodium acetate buffer solution of pH 4.5 admixed with 150 ml. petroleum ether over 24 hours at 20° C. After working up the mixture as in the preceding examples, the alkoxyglycerolesters were obtained in a concentration of 7.5 percent.

*Example 6.*—Seeds from the plant Ricinus communis are milled in the presence of water. The milled product has a milky appearance and is centrifuged at high speed. All nonlipolytic constituents sediment except the active ingredients are concentrated in the supernatant layer that looks like a heavy cream. The supernatant layer is left in a separate vessel at 24° C. (±1° C.) for 24 hours. Again a supernatant layer is formed and skimmed off. In this second supernatant layer a further concentration of the lipase is obtained.

1 kilogram of residual oil from the molecular distillation of the liver oil from the fish Somniosus microcephalus is treated with 60 grams of lipase extract from wet milled castor beans, 2 liters of water buffered to pH 4.5 with sodium acetate buffer and 2 grams of manganese sulphate. The mixture is stirred during 24 hours at 20° C. After separation of the water phase from the oil phase, the latter is treated first with soda lime and thereafter with caustic alkali, in doing which the water phase each time is left to separate from the oil phase before carrying out the next operation. After the content of free fatty acids was brought below 1 percent in the oil phase, this phase had a percentage of more than 90 percent of alkoxyglycerolesters.

*Example 7.*—1 kilogram of alkoxyglycerolesters obtained by selective hydrolysis of liver oil from the fish *Somniosus microcephalus* by treatment of that oil with Ricinus lipase as in the other examples is saponified with 150 grams of potassium hydroxide in 3 liters of water, and the resulting soap solution then is extracted with ethyl ether. On this extraction, the ether is divided into three portions of 3 liters each for three successive extractions. From the resulting combined ethereal solutions, the alkoxyglycerols are obtained by evaporating off the ether.

*Example 8.*—The mixture of esters and fatty acids obtained by selective hydrolysis of liver oil from the fish *Somniosus microcephalus* by treatment of that oil with Ricinus lipase as in the other examples is transferred to a distillation apparatus, and the fatty acids are distilled off mostly by steam at 10 mm. Hg and a temperature of 250° C. The residue containing alkoxyglycerolesters and the rest of the fatty acids are then refined in one or more steps by saponification with alkali. After the free fatty acid content is reduced below 1 percent, the recovered alkoxyglycerolester content is above 90 percent.

While the invention has been explained by detailed description of certain specific embodiments of it, it is understood that various modifications and substitutions can be made in them within the scope of the appended claims which are intended also to cover equivalents of the specific embodiments.

What is claimed is:

1. The method of isolating alkoxyglycerolesters from natural source lipid-containing starting materials containing them and triglycerides, which method comprises subjecting such starting material to the hydrolytic triglyceride-splitting action of a triglyceride-splitting concentration of a triglyceride-splitting lipolytic enzyme inert to alkoxyglycerolesters and for a sufficient time to hydrolyze the triglycerides contained in the starting material to the corresponding fatty acids and glycerol; and removing the fatty acids and the glycerol from the alkoxyglycerolesters.

2. The method of isolating alkoxyglycerolesters from natural source lipid-containing starting materials containing them and triglycerides, which method comprises subjecting such starting material to the hydrolytic triglyceride-splitting action of a triglyceride-splitting concentration of the lipolytic enzym contained in the residue of seeds of the plant *Ricinus communis* after removal therefrom of their ether-soluble content, and for a time sufficient to hydrolyze the triglycerides contained in the starting material to the corresponding fatty acids and glycerol; and removing the fatty acids and the glycerol from the alkoxyglycerolesters.

3. The method of isolating alkoxyglycerolesters from natural source lipid-containing starting materials containing them and triglycerides, which method comprises subjecting such starting material to the hydrolytic triglyceride-splitting action of a triglyceride-splitting concentration of Ricinus lipase, and for a time sufficient to hydrolyze the triglycerides contained in the starting material to the corresponding fatty acids and glycerol; and removing the fatty acids and the glycerol from the alkoxyglycerolesters.

4. The method of isolating alkoxyglycerolesters from natural source lipid-containing starting materials containing them and triglycerides and which starting material is a member of the class consisting of fats, mixtures of fats, fatty oils, mixtures of fatty oils, milk fat, egg oil, bone grease, fish liver oils, and lipids from bone marrow, liver, spleen, and blood red cells, which method comprises subjecting such starting material to the hydrolytic triglyceride-splitting action of a triglyceride-splitting concentration of Ricinus lipase and for a time sufficient to hydrolyze the triglycerides contained in the starting material to the corresponding fatty acids and glycerol; and removing the fatty acids and the glycerol from the alkoxyglycerolesters.

5. A method of isolating alkoxyglycerolesters as claimed in claim 4, wherein the lipolytic enzyme is Ricinus lipase.

6. The method of isolating alkoxyglycerolesters from a fish liver oil containing them, which comprises subjecting such oil to the hydrolytic triglyceride-splitting action of a triglyceride-splitting concentration of a triglyceride-splitting lipolytic enzyme inert to alkoxyglycerolesters and for a time sufficient to hydrolyze the triglycerides contained in the oil to the corresponding fatty acids and glycerol; and removing the fatty acids and glycerol from the alkoxyglycerolesters.

7. A method as claimed in claim 6, wherein the alkoxyglycerolesters comprise mainly batyl and selachyl alchols.

8. A method of isolating alkoxyglycerolesters as claimed 6, wherein the triglyceride-splitting enzyme is contained in the residue of seeds of the plant *Ricinus communis* after removal therefrom of their ether-soluble content.

9. A method of isolating alkoxyglycerolesters as claimed in claim 8, wherein the lipolytic enzyme is Ricinus lipase.

10. A method of isolating alkoxyglycerolesters as claimed in claim 8, wherein a shark liver oil, pulverized ether-extracted seeds of the plant *Ricinus communis*, a sodium acetate buffer solution of pH about 4.5 and petroleum ether are intimately contacted with one another for about a day, and in the proportions to one another of about one kilogram of the oil to fifty grams of the pulverized ether-extracted seeds to about two liters of the buffer solution to about two and one-half liters of the petroleum ether.

11. A method of isolating alkoxyglycerolesters as claimed in claim 10, wherein a shark liver oil is treated under intimate contact with a lipase concentrate from wet milled caster beans in the presence of water buffered to pH about 4.5 with sodium acetate buffer under the addition of manganese sulphate for about a day at about 24° C., and in the proportion to one another of about one kilogram of oil to 60 grams of said lipase concentrate to 2 liters of buffered water and to 2 grams of manganese sulphate.

References Cited in the file of this patent

UNITED STATES PATENTS

| 1,121,926 | Kaempfe | Dec. 22, 1914 |
| 2,395,790 | Parfentjev | Feb. 26, 1946 |
| 2,676,906 | Rose et al. | Apr. 27, 1954 |

OTHER REFERENCES

Tauber: Chemistry and Technology of Enzymes, 1949, published by John Wiley and Sons, Inc. (N.Y.), pp. 483, 499 and 500.